(12) United States Patent
Yagi (10) Patent No.: US 8,384,741 B2
(45) Date of Patent: Feb. 26, 2013

(54) NUMERICAL-SIMULATION-RESULT DISPLAY PROGRAM, NUMERICAL-SIMULATION-RESULT DISPLAY METHOD, AND NUMERICAL-SIMULATION-RESULT DISPLAY SYSTEM

(75) Inventor: Hajime Yagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 712 days.

(21) Appl. No.: 12/014,553

(22) Filed: Jan. 15, 2008

(65) Prior Publication Data
US 2008/0174611 A1 Jul. 24, 2008

(30) Foreign Application Priority Data
Jan. 23, 2007 (JP) ................................. 2007-012384

(51) Int. Cl.
*G09G 5/00* (2006.01)
*G06F 17/50* (2006.01)
(52) U.S. Cl. ........................................... 345/630; 703/1
(58) Field of Classification Search .................. 345/629, 345/634; 703/1, 6, 7
See application file for complete search history.

(56) References Cited

U.S. PATENT DOCUMENTS

| | | | | |
|---|---|---|---|---|
| 4,989,083 A * | 1/1991 | Eino | .............................. | 348/135 |
| 5,136,497 A * | 8/1992 | Coe et al. | ........................ | 700/45 |
| 6,319,682 B1 * | 11/2001 | Hochman | ....................... | 435/29 |
| 6,355,387 B1 * | 3/2002 | Fujinaga et al. | ................ | 430/30 |
| 6,598,208 B2 * | 7/2003 | Sasaki et al. | .................... | 716/115 |
| 6,760,691 B1 * | 7/2004 | Ito | .................................... | 703/1 |
| 7,234,937 B2 * | 6/2007 | Sachdeva et al. | ............... | 433/24 |
| 7,246,045 B1 * | 7/2007 | Rappaport et al. | ................ | 703/2 |
| 7,260,544 B1 * | 8/2007 | Reinitz et al. | ................... | 705/1.1 |
| 7,373,284 B2 * | 5/2008 | Stabelfeldt et al. | ............... | 703/2 |
| 7,834,987 B2 * | 11/2010 | Reinitz et al. | .................... | 356/31 |
| 7,840,386 B2 * | 11/2010 | Rassaian et al. | ................... | 703/1 |
| 2001/0044668 A1 * | 11/2001 | Kimbrough et al. | .......... | 700/118 |
| 2005/0104884 A1 * | 5/2005 | Iwata et al. | ..................... | 345/440 |
| 2006/0044307 A1 * | 3/2006 | Song | ............................ | 345/419 |

FOREIGN PATENT DOCUMENTS

| | | |
|---|---|---|
| JP | 2009-006990 | 10/1997 |
| JP | 2005-044146 | 2/2005 |
| JP | 2006-023875 | 1/2006 |
| JP | 2006-268174 | 5/2006 |
| JP | 2006-195971 | 7/2006 |
| JP | 2006-273138 | * 10/2006 |

OTHER PUBLICATIONS

Japanese Office Action dated Oct. 18, 2011 for Japanese Application No. 2007-012384.

* cited by examiner

*Primary Examiner* — Ryan R Yang
(74) *Attorney, Agent, or Firm* — SNR Denton US LLP

(57) ABSTRACT

A numerical-simulation-result display system includes an image output apparatus, a three-dimensional-CAD-model-data input unit configured to read three-dimensional-CAD-model data of an object to be analyzed, a CAD-model-data converting unit configured to convert the read three-dimensional-CAD-model data into CAD graphic data capable of being displayed on the image output apparatus, a numerical-simulation-result-data input unit configured to read numerical-simulation-result data of the object, a simulation-result converting unit configured to convert the read numerical-simulation-result data into simulation-result graphic data capable of being displayed on the image output apparatus, and a display unit configured to display the CAD graphic data and the simulation-result graphic data on the image output apparatus in a superimposed manner.

12 Claims, 8 Drawing Sheets

FIG. 8

NUMERICAL-SIMULATION-RESULT DISPLAY PROGRAM, NUMERICAL-SIMULATION-RESULT DISPLAY METHOD, AND NUMERICAL-SIMULATION-RESULT DISPLAY SYSTEM

CROSS REFERENCES TO RELATED APPLICATIONS

The present invention contains subject matter related to Japanese Patent Application JP 2007-012384 filed in the Japanese Patent Office on Jan. 23, 2006, the entire contents of which are incorporated herein by reference.

BACKGROUND OF THE INVENTION

1. Field of the Invention

The present invention relates to a numerical-simulation-result display program, a numerical-simulation-result display method, and a numerical-simulation-result display system.

2. Description of the Related Art

Currently, in a wide range of fields such as structural analysis, heat transfer analysis, thermal-liquid analysis, and electromagnetic field analysis, numerical simulation technologies using numerical analysis methods such as a finite different method, a finite element method, a finite volume method, and a boundary element method are being developed and coming into practical use for revealing physical phenomena.

When numerical simulation of the above type is performed, dedicated analysis software (simulator) prepared according to a type of physical quantity to be analyzed is used. A numerical simulation result is displayed by methods such as adding color gradation to a simplified model, and changing a color tone (see Japanese Unexamined Patent Application Publication No. 2005-44146).

In addition, in mechanism design or the like, three-dimensional CAD (computer-aided design) software is used. By using the three-dimensional CAD software, a three-dimensional CAD model created by the three-dimensional CAD software is three-dimensionally displayed (see Japanese Unexamined Patent Application Publication No. 2006-195971).

SUMMARY OF THE INVENTION

As described above, numerical simulation is performed by each of separate pieces of dedicated software, and the pieces of the software operate on different platforms. Thus, the pieces of the software do not simultaneously operate on the same platform.

Therefore, it is difficult to simultaneously display, for comparison, results of numerical simulation of different types of physical quantity, for example, results of a structural analysis, a thermal-liquid analysis, and an electromagnetic field analysis.

Accordingly, it is difficult to simultaneously confirm physical phenomena calculated by numerical analyses. To study the physical phenomena, it is necessary to switch between pieces of analysis software each time.

Thus, to study the physical phenomena, it is necessary to use the pieces of analysis software, and, since it is difficult to simultaneously view analysis results, there is a disadvantage in that analyzing and studying need a lot of time.

In addition, as is obvious, three-dimensional CAD software operates on a platform different from the platform for the analysis software. Accordingly, it is difficult to simultaneously display, on the same platform, a three-dimensional model created by three-dimensional CAD software and numerical simulation results generated by the pieces of the analysis software.

Therefore, it is difficult to simultaneously confirm the three-dimensional model and physical phenomena calculated in the numerical analyses, so that there is a disadvantage in that analyzing and studying need a lot of time.

In addition, in a numerical simulation model, from a model shape in design, elements are segmented and calculation is performed. Numerical calculation is performed, with a segmented element used as a calculation unit (mesh).

When element segmentation is faithfully performed on the basis of a model shape in design, a very large number of meshes are produced. Accordingly, normally, a numerical analysis model is created by modifying the model shape in design. In addition, modification and shape of a model variously change depending on analysis types (such as a structural analysis and a thermal-liquid analysis).

In these circumstances, even for the same model to be analyzed, there is a large difference in shape between three-dimensional CAD model data created by three-dimensional CAD software and various numerical analysis model data.

In the case of displaying the three-dimensional CAD model data and the various numerical analysis model data in a switching manner, it is difficult to establish consistency in shape between the three-dimensional CAD model data and a numerical analysis model, or between numerical analysis models based on different techniques, so that analyzing and studying need a lot of time.

The present invention has been made in view of the above-described circumstances. It is desirable to provide a numerical-simulation-result display program, a numerical-simulation-result display method, and a numerical-simulation-result display system which simultaneously display three-dimensional model data and various-numerical-simulation-result data when various numerical simulation results are studied, and which are advantageous in reducing a time necessary for analyzing and studying.

A numerical-simulation-result display program according to an embodiment of the present invention allows a computer to execute the steps of: reading three-dimensional-computer-aided-design-model data of an object to be analyzed; converting the read three-dimensional-computer-aided-design-model data into computer-aided-design graphic data capable of being displayed on an image output apparatus; reading numerical-simulation-result data of the object; converting the read numerical-simulation-result data into simulation-result graphic data capable of being displayed on the image output apparatus; and displaying the computer-aided-design graphic data and the simulation-result graphic data on the image output apparatus in a superimposed manner.

A numerical-simulation-result display method according to another embodiment of the present invention includes the steps of: reading three-dimensional-computer-aided-design-model data of an object to be analyzed; converting the read three-dimensional-computer-aided-design-model data into computer-aided-design graphic data capable of being displayed on an image output apparatus; receiving numerical-simulation-result data of the object; converting the read numerical-simulation-result data into simulation-result graphic data capable of being displayed on the image output apparatus; and displaying the computer-aided-design graphic data and the simulation-result graphic data on the image output apparatus in a superimposed manner.

A numerical-simulation-result display system according to another embodiment of the present invention includes an image output apparatus, three-dimensional-computer-aided-design-model-data input means for reading three-dimensional-computer-aided-design-model data of an object to be analyzed, computer-aided-design-model-data converting means for converting the three-dimensional-computer-aided-design-model data read by the three-dimensional-computer-aided-design-model-data input means into computer-aided-design graphic data capable of being displayed on the image output apparatus, numerical-simulation-result-data input means for reading numerical-simulation-result data of the object, simulation-result converting means for converting the numerical-simulation-result data read by the numerical-simulation-result-data input means into simulation-result graphic data capable of being displayed on the image output apparatus, and display means for displaying the computer-aided-design graphic data and the simulation-result graphic data on the image output apparatus in a superimposed manner.

According to an embodiment of the present invention, by simultaneously viewing three-dimensional CAD model data and numerical-simulation-result data (physical quantity) that are displayed in a superimposed manner on an image output apparatus, an operator can visually recognize the shape of an object (to be analyzed) indicated by the three-dimensional CAD model data and the numerical-simulation-result data (physical quantity) in a form in which both are associated with each other. This is an advantage in reducing a time necessary for analyzing and studying.

DESCRIPTION OF THE PREFERRED EMBODIMENTS

An embodiment of the present invention is described below with reference to the accompanying drawings.

Figure 1:
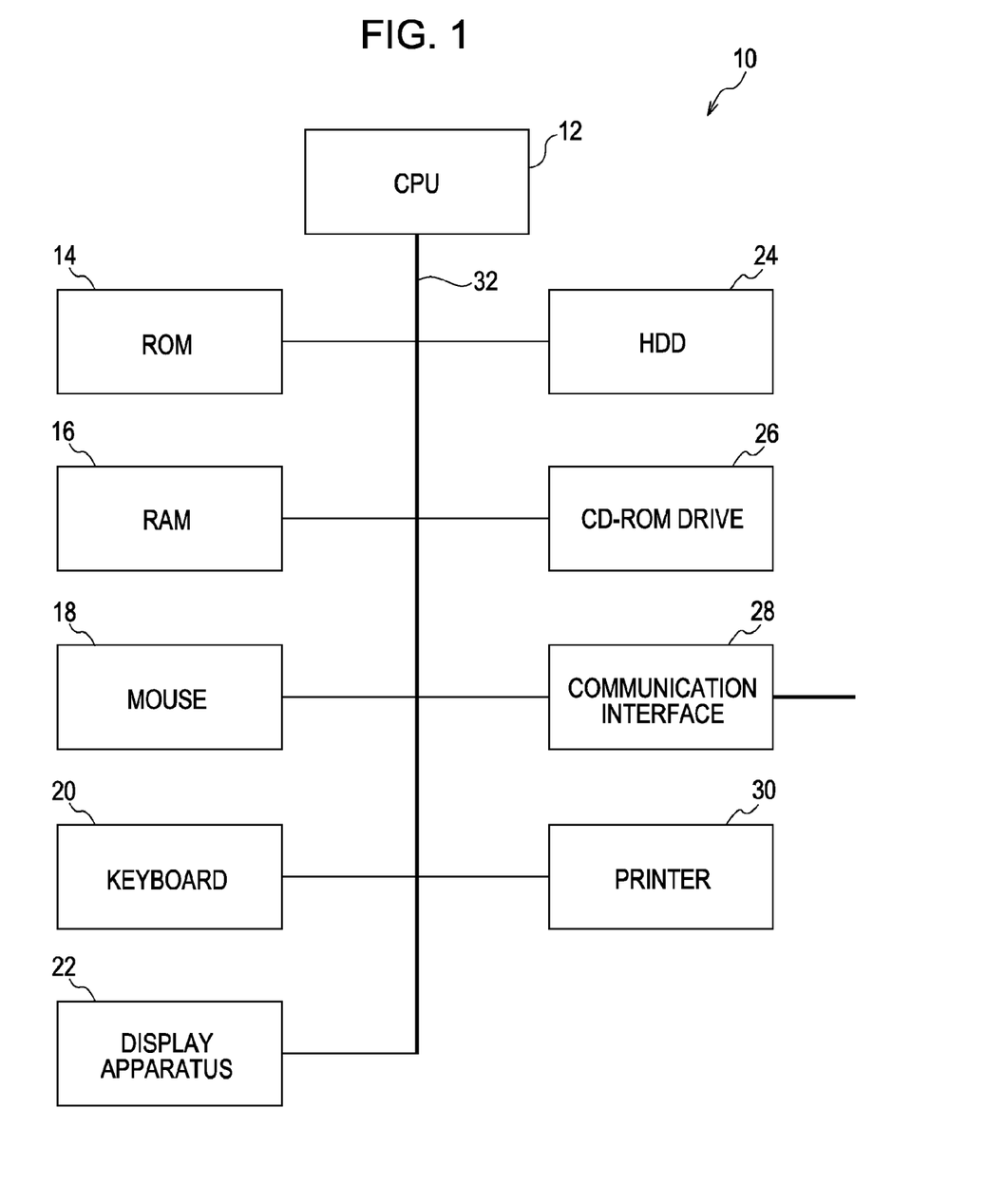
FIG. 1 is a block diagram showing a computer for executing a numerical-simulation-result display program according to an embodiment of the present invention.

FIG. 1 is a block diagram showing a computer 10 for executing a numerical-simulation-result display program according to the embodiment.

As shown in FIG. 1, the computer 10 includes a CPU (central processing unit) 12, a ROM (read-only memory) 14, a RAM (random access memory) 16, a mouse 18, a keyboard 20, a display apparatus 22, an HDD (hard disk drive) 24, a CD-ROM (compact-disc read-only memory) drive 26, a communication interface 28, and a printer 30.

The ROM 14 is formed by a nonvolatile memory and stores setting data, etc.

The RAM 16 forms a working area.

The mouse 18 is an input device operated by an operator.

The keyboard 20 is an input device operated by the operator.

The display apparatus 22 is an image output apparatus for displaying images and characters. In this embodiment, the display apparatus 22 can display colors.

The HDD 24 stores an operating system, various types of application software, and data.

In addition, in the HDD 24, the numerical-simulation-result display program according to the embodiment is installed.

The CD-ROM drive 26 is used to read and write data on a disc recording medium such as a CD-ROM.

The communication interface 28 is connected to a network such as a local area network or the Internet, and performs communication with the network.

The printer 30 is an image output apparatus for printing out images and characters.

The CPU 12 is connected by a bus 32 to the ROM 14, the RAM 16, the mouse 18, the keyboard 20, the display apparatus 22, the HDD 24, the CD-ROM drive 26, the communication interface 28, and the printer 30, and controls them.

In addition, the CPU 12 executes a numerical-simulation-result display method in the embodiment by executing the numerical-simulation-result display program according to the embodiment.

The computer 10 forms a numerical-simulation-result display system in the embodiment of the present invention.

Figure 2:
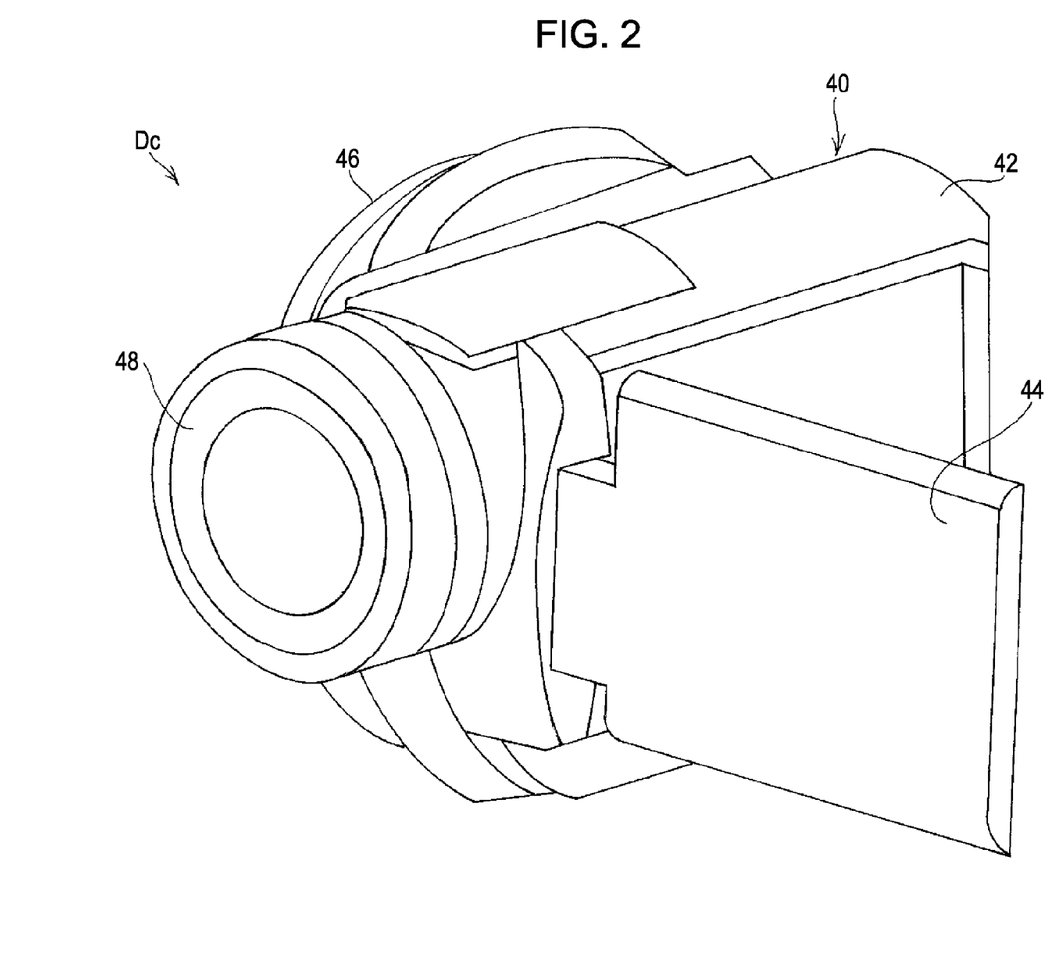
FIG. 2 is an illustration showing three-dimensional CAD model data of an object to be analyzed.

FIG. 2 is an illustration showing three-dimensional CAD model data of an object 40 to be analyzed.

In the embodiment, the object 40 to be analyzed is a video camera.

The object 40 has a housing 42 forming an outer surface. On the right of the housing 42, a display panel 44 for displaying a picked-up image is provided so as to be opened and closed. On the left of the housing 42, a recording/playback unit 46 for recording and playing back image data on a disc recording medium is provided.

In a front portion of the housing 42, a lens tube 48 for leading a subject image to an image pickup element built into the housing 42.

As shown in FIG. 2, the three-dimensional CAD model data accurately displays an outer shape of the object 40, which is an actual object to be analyzed.

Figure 3:
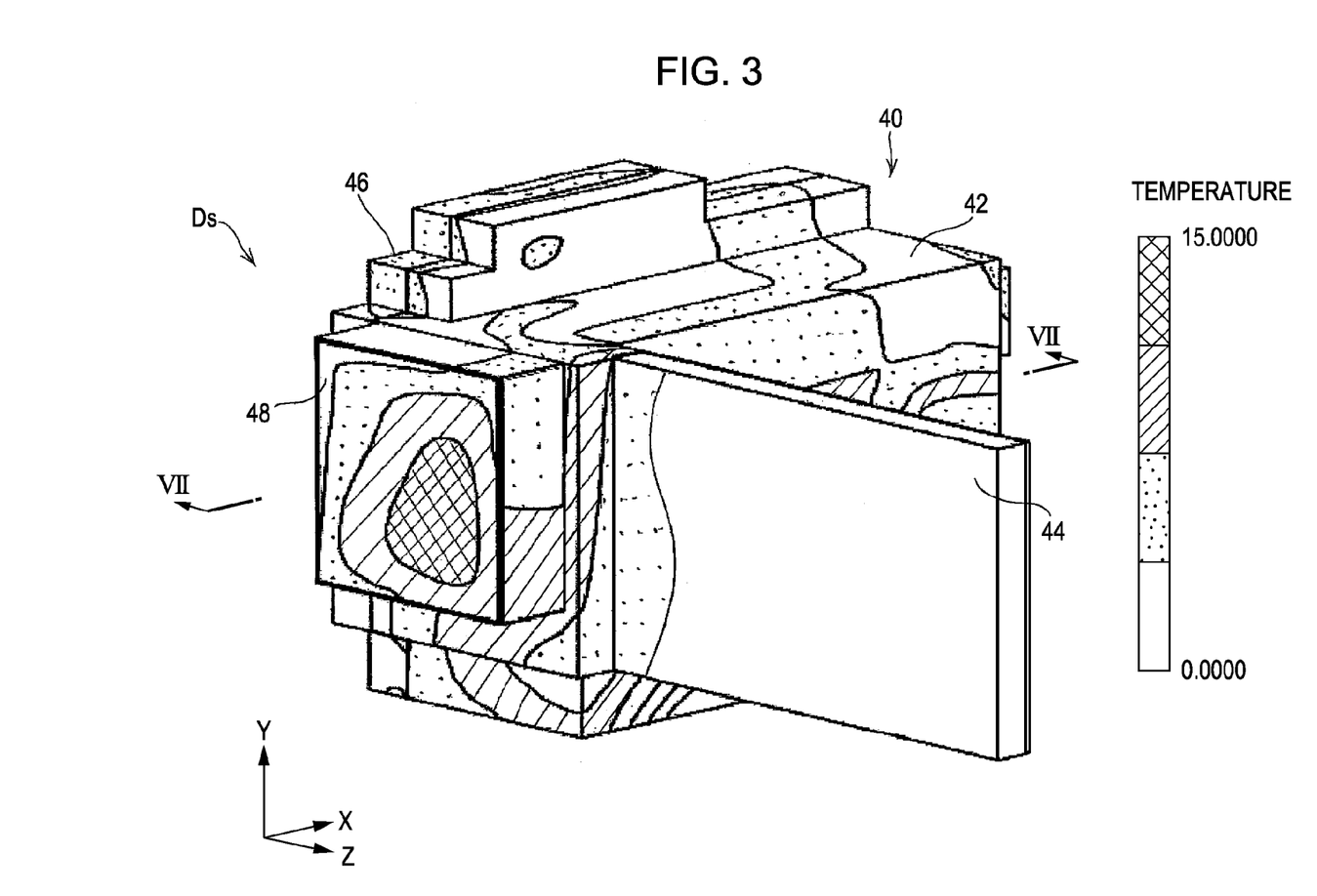
FIG. 3 is an illustration showing numerical-simulation-result data obtained by performing a thermal-liquid analysis on the object to be analyzed.
Figure 4:
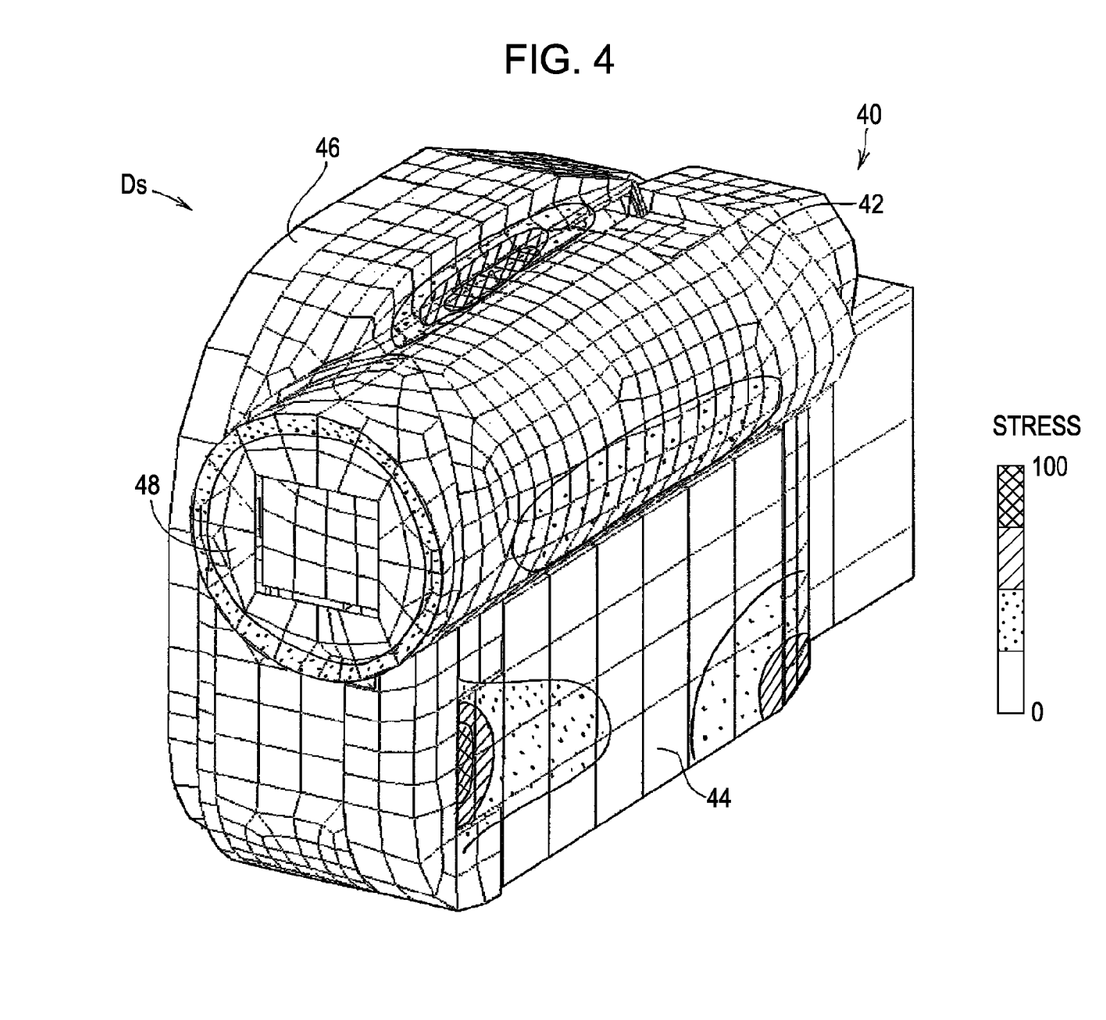
FIG. 4 is an illustration of numerical-simulation-result obtained by performing a structural analysis on the object to be analyzed.

FIG. 3 is an illustration showing numerical-simulation-result data obtained by performing a thermal-liquid analysis on the object 40. FIG. 4 is an illustration showing numerical-simulation-result data obtained by performing a structural analysis on the object 40.

As shown in FIGS. 3 and 4, the numerical-simulation-result is displayed in a form in which the outer shape of the object 40 is simplified (modified).

In the thermal-liquid analysis shown in FIG. 3, the outer shape of the object 40 is simplified (modified) by using orthogonal difference meshes.

As shown in FIG. 3, in the case of the thermal-liquid analysis, a temperature as physical quantity is indicated by a color gradation difference or a color tone difference (change in color). In FIG. 3, the color gradation difference or the color tone difference is indicated by a change in hatching pattern.

In the structural analysis shown in FIG. 4, the outer shape of the object 40 is simplified (modified) by using finite element meshes.

As shown in FIG. 4, in the case of the structural analysis, a stress as physical quantity is indicated by a color gradation difference or a color tone difference. The color gradation difference or the color tone difference is indicated by a change in hatching pattern.

In each of FIGS. 3 and 4, for brevity of illustration, values of the physical quantity are shown, with the values divided into four levels. However, levels of the values of the physical quantity are arbitrary if the levels lie in a visible range.

Figure 5:
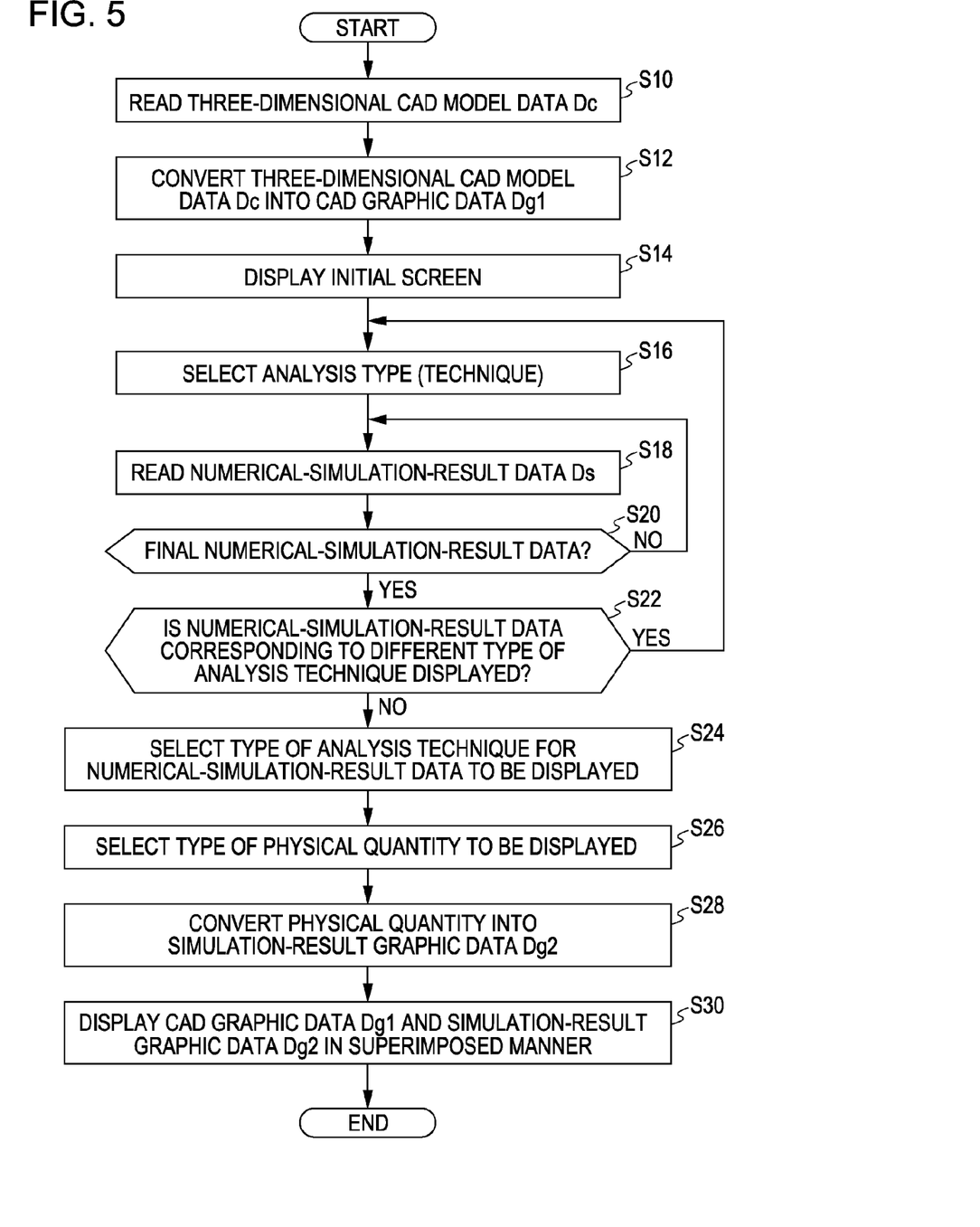
FIG. 5 is a flowchart showing the numerical-simulation-result according to the embodiment.

With the numerical-simulation-result display program according to the embodiment, as shown in FIG. 5, the three-dimensional CAD model data shown in FIG. 2 and the numerical-simulation-result data shown in FIG. 3 or 4 are displayed in a superimposed (overlapping) manner. In other words, the numerical-simulation-result display program has a viewer function of displaying the three-dimensional CAD model data shown in FIG. 2 and the numerical-simulation-result data shown in FIG. 3 or 4 in a superimposed manner.

Next, the numerical-simulation-result display method using the numerical-simulation-result display program according to the embodiment is fully described below.

FIG. 5 is a flowchart showing the numerical-simulation-result display program according to the embodiment.

The numerical-simulation-result display program is executed by the CPU 12, whereby the following process is executed.

In step S10 (three-dimensional-CAD-model-data input step), three-dimensional CAD model data Dc of the object 40 (see FIG. 2) is read (initial data is read).

Three-dimensional CAD data Dc is created by three-dimensional CAD software of the related art. Regarding reading of three-dimensional CAD model data Dc, three-dimensional CAD model data Dc (file), which is in a state recorded on a disc recording medium such as a CD-ROM, may be read by using the CD-ROM drive 26, and three-dimensional CAD model data Dc may be read from the network through the communication interface 28.

The read three-dimensional CAD model data Dc is temporarily stored in, for example, the HDD 24.

In step S12 (CAD-model-data converting step), the three-dimensional CAD model data Dc temporarily stored in the HDD 24 is converted into CAD graphic data Dg1 capable of being displayed on the display apparatus 22.

The obtained CAD graphic data Dg1 is temporarily stored in, for example, the HDD 24.

As the conversion of three-dimensional CAD model data Dc into CAD graphic data Dg1, various converting processes used in three-dimensional CAD software of the related art can be employed. In the conversion, for example, the CPU 12 loads three-dimensional CAD model data Dc read from the HDD 24 into the RAM 16, and performs arithmetic processing.

In the embodiment, step S12 corresponds to the three-dimensional-computer-aided-design-model-data converting step in the appended claims.

In step S14, CAD graphic data Dg1 is displayed by the display apparatus 22, whereby an initial screen is displayed.

In step S16 (analysis type selecting step), an analysis type (technique) for numerical-simulation-result data (analysis-result data) Ds to be displayed in a form superimposed on three-dimensional CAD model data Dc is selected.

This selecting operation is performed such that, after a menu screen for selecting an analysis technique is displayed on the display apparatus 22, the operator operates the mouse 18 or the keyboard 20, and the CPU 12 receives an input operation.

In addition, analysis types include, for example, various analysis techniques of the related art, such as a structural analysis, a thermal-liquid analysis, and an electromagnetic field analysis.

In step S18 (numerical-simulation-result-data input step), numerical-simulation-result data Ds of the object 40 which corresponds to the analysis type selected in step S16 is read. More specifically, a data format of numerical-simulation-result data Ds differs depending on an analysis type. Accordingly, the CPU 12 reads numerical-simulation-result data Ds in accordance with the data format selected in step S16.

Numerical-simulation-result data Ds is created by numerical analysis software of the related art. Regarding reading of numerical-simulation-result data Ds, similarly to the case of three-dimensional CAD model data Dc, for example, numerical-simulation-result data Ds, which is in a state recorded on a disc recording medium such as a CD-ROM, may be read, and numerical-simulation-result data Ds may be read from the network through the communication interface 28.

The read numerical-simulation-result data Ds is temporarily stored in, for example, the HDD 24.

Numerical-simulation-result data Ds includes at least one type of physical quantity. In addition to the physical quantity, numerical-simulation-result data Ds also includes outline data obtained by simplifying the outer shape of the object 40.

If the analysis technique is, for example, a structural analysis, numerical-simulation-result data Ds includes plural types of physical quantity such as a stress, a strain, and a shearing stress.

Alternatively, if the analysis technique is a thermal-liquid analysis, numerical-simulation-result data Ds includes plural types of physical quantity such as a temperature, a flow velocity, and heat flux.

In addition, in many cases, numerical-simulation-result data Ds changes with a lapse of time. Thus, numerical-simulation-result data Ds frequently includes a plurality of files created in units of a time.

Accordingly, in step S20, it is determined whether or not numerical-simulation-result data Ds to be read is final data. If numerical-simulation-result data Ds to be read is not final data (if it is negatively determined in step S20), the process returns to step S18, and reading is performed. If numerical-simulation-result data Ds to be read is final data (if it is affirmatively determined in step S20, the process proceeds to step S22.

In step S22, it is selected whether numerical-simulation-result data Ds corresponding to a different type of analysis technique is to be displayed with three-dimensional CAD model data Dc in a superimposed manner.

This selecting operation is performed, for example, by selecting the analysis technique, or in such a manner that, after a menu screen for directing termination of selection is displayed on the display apparatus 22, the operator operates the mouse 18 or the keyboard 20, and the CPU 12 receives an input operation.

If it is selected that numerical-simulation-result data Ds corresponding to the different type of analysis technique is to be displayed (if it is affirmatively determined in step S22), the process proceeds to step S16. If termination of selection is selected (if it is negatively determined in step S22), the process proceeds to step S24.

After reading of numerical-simulation-result data Ds finishes as described above, in step S24, a type of analysis technique for numerical-simulation-result data Ds to be displayed with three-dimensional CAD model data Dc in a superimposed manner is selected.

This selecting operation is performed such that, after a menu screen for selecting the analysis technique is displayed on the display apparatus 22, the operator operates the mouse 18 or the keyboard 20, and the CPU 12 receives an input operation.

In step S26, a type of physical quantity of numerical-simulation-result data Ds to be displayed with three-dimensional CAD model data Dc in a superimposed manner is selected.

For example, if the analysis technique selected in step S24 is a structural analysis, the physical quantity of numerical-simulation-result data Ds is selected from a stress, a strain, and a shearing stress. If the analysis technique selected in step S24 is a thermal-liquid analysis, the physical quantity of numerical-simulation-result data Ds is selected from a temperature, a flow velocity, and heat flux.

This selecting operation is performed such that, for example, after a menu screen for selecting the physical quantity is displayed on the display apparatus 22, the operator operates the mouse 18 or the keyboard 20, and the CPU 12 receives an input operation.

In step S28 (simulation-result converting step), the physical quantity of numerical-simulation-result data Ds, selected in step S26, is converted into simulation-result graphic data Dg2 capable of being displayed on the display apparatus 22.

As the conversion of the physical quantity of numerical-simulation-result data Ds into simulation-result graphic data Dg2, various converting processes used in numerical simulation software of the related art can be employed.

In addition, CAD graphic data Dg1 obtained in step S12 and simulation-result graphic data Dg2 obtained in step S28 are adjusted so that, when both are displayed on the display apparatus 22 in a superimposed manner, both are displayed in the same coordinate system.

In step S30, CAD graphic data Dg1 obtained in step S12 and simulation-result graphic data Dg2 obtained in step S28 are simultaneously displayed on the display apparatus 22 in a superimposed manner.

Figure 6:
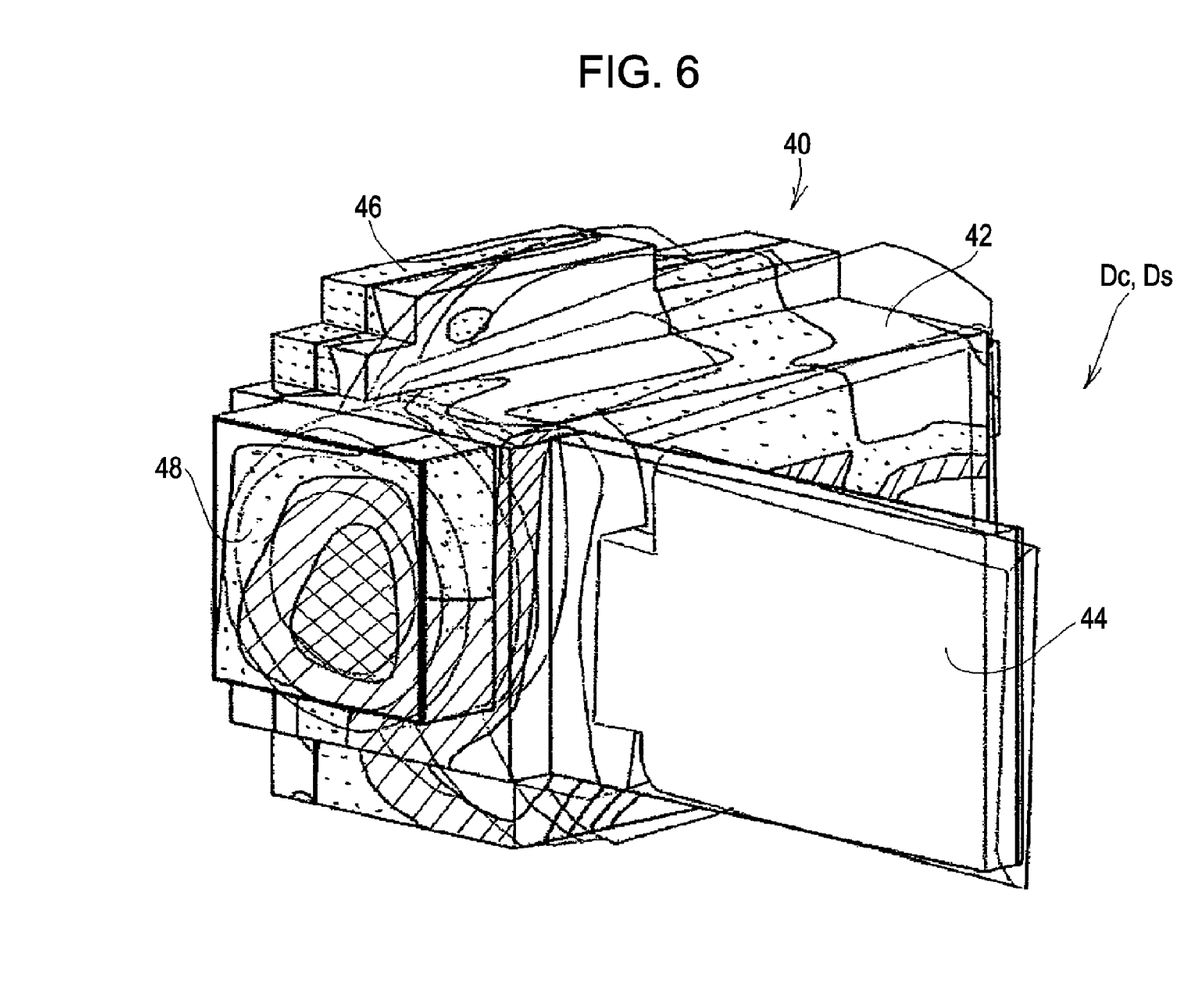
FIG. 6 is an illustration of an example in which three-dimensional CAD model data Dc and numerical-simulation-result data Ds are displayed in a superimposed manner on a display apparatus.

FIG. 6 is an illustration showing an example in which three-dimensional CAD model data Dc and numerical-simulation-result data Ds are displayed on the display apparatus 22 in a superimposed manner.

When the analysis technique is a thermal-liquid analysis, three-dimensional CAD model data Dc (CAD graphic data Dg1) shown in FIG. 2, and heat that is physical quantity as numerical-simulation-result data Ds (simulation-result graphic data Dg2) (shown in FIG. 3) obtained by the thermal-liquid analysis are displayed in a superimposed manner, whereby the image shown in FIG. 6 is displayed on the display apparatus 22.

In the example shown in FIG. 6, three-dimensional CAD model data Dc of the object 40, and three-dimensionally shown numerical-simulation-result data Ds that is obtained by simplifying (modifying) the outer shape of the object 40 are displayed in a superimposed manner.

In this case, as three-dimensional CAD model data Dc, only the outline of the object 40 may be displayed, or a surface of the object 40 may be displayed, with the surface made transparent.

In the embodiment, as described above, the computer 10 forms the numerical-simulation-result display system. The computer 10, which executes step S10 (three-dimensional-CAD-model-data input step), forms three-dimensional-CAD-model-data input means. The computer 10, which executes step S12 (CAD-model-data converting step), forms CAD-model-data converting means. The computer 10, which executes step S18 (numerical-simulation-result-data input step), forms numerical-simulation-result-data input means. The computer 10, which executes step S28 (simulation-result converting step), forms simulation-result converting means. The computer 10, which executes step S30, forms display means.

Therefore, in the embodiment, by simultaneously viewing three-dimensional CAD model data Dc and numerical-simulation-result data Ds (physical quantity) that are displayed in a superimposed manner on the display apparatus 22, the operator can visually recognize the shape of the object 40 indicated by three-dimensional CAD model data Dc and a simulation result based on numerical-simulation-result data Ds (physical quantity) in a form in which both are associated with each other. This is an advantage in reducing a time necessary for analyzing and studying.

In other words, in the embodiment, it can be easily understood that a distribution based on numerical-simulation-result data Ds (color tone difference or gradation difference) corresponds to which portion of the object 40 (three-dimensional CAD model).

As a display form in the case of displaying three-dimensional CAD model data Dc and numerical-simulation-result data Ds in a superimposed manner, in addition to the display example shown in FIG. 6, the following display forms are possible.

Figure 7:
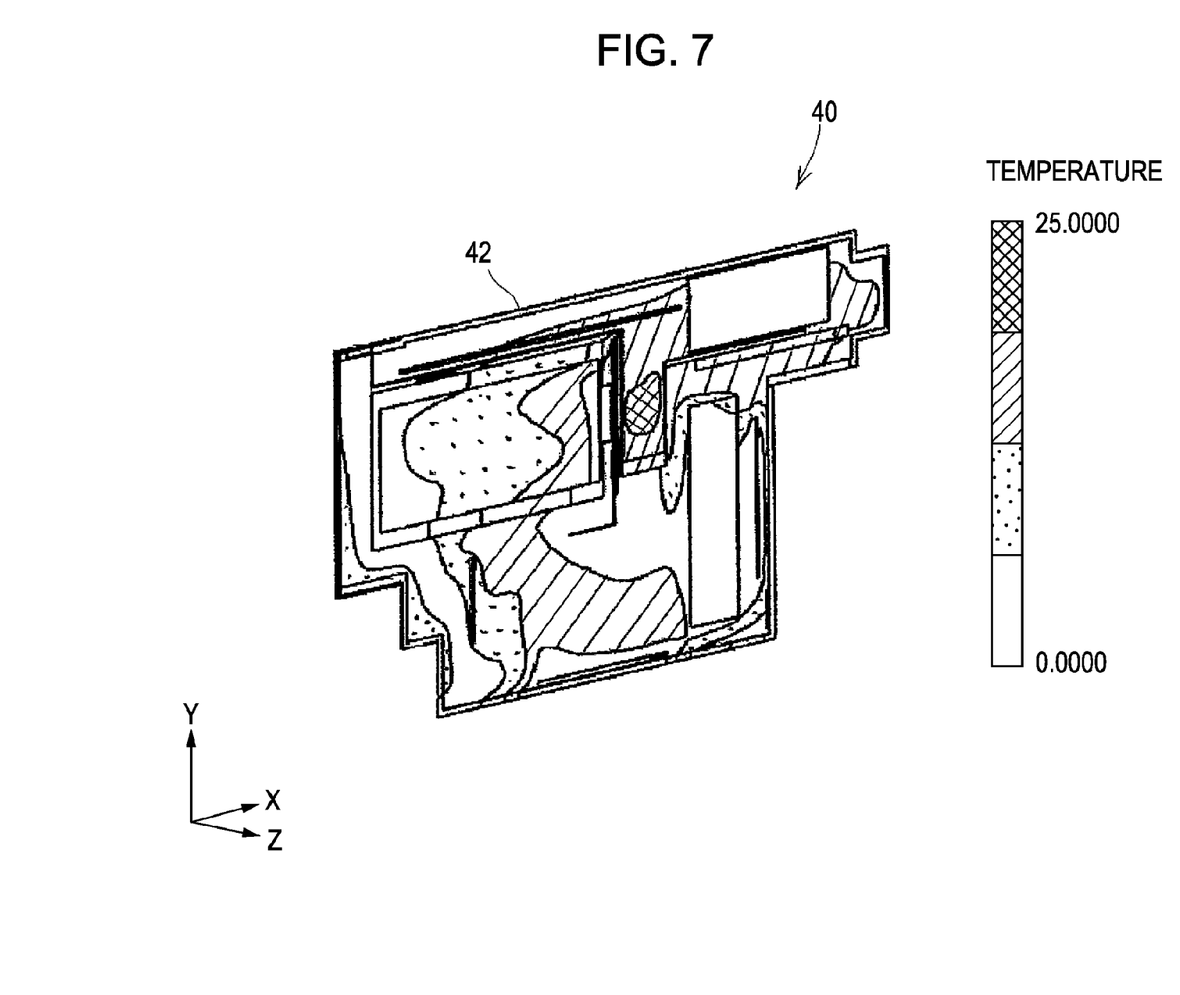
FIG. 7 is an illustration of numerical-simulation-result data Ds on a section.

As shown in FIG. 7, numerical-simulation-result data Ds on a section of the object 40 which corresponds to the section taken on line VII-VII shown in FIG. 3 is obtained.

Figure 8:
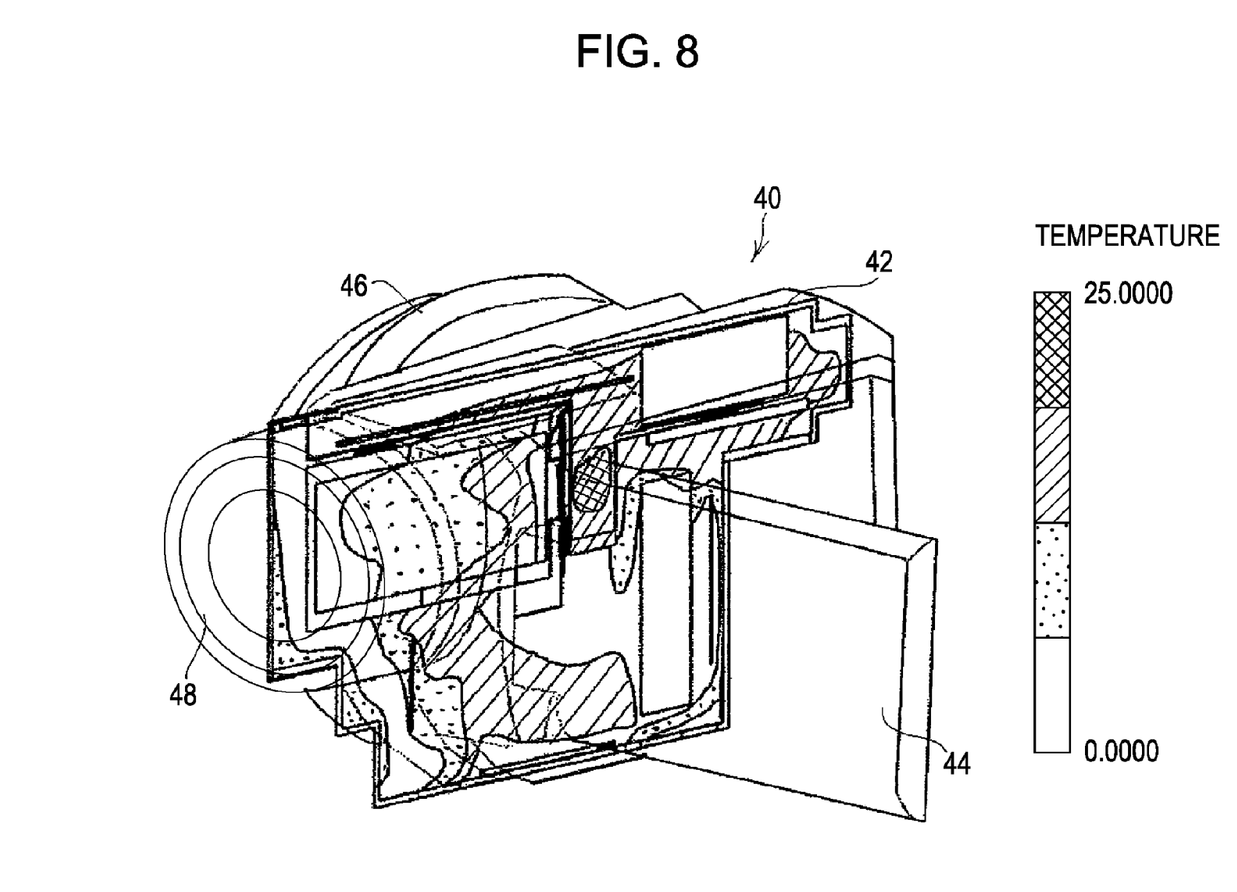
FIG. 8 is an illustration showing an example in which three-dimensional CAD model data Dc, and numerical-simulation-result data Ds on a section are displayed in a superimposed manner on the display apparatus.

As shown in FIG. 8, three-dimensional CAD model data Dc (CAD graphic data Dg1) shown in FIG. 2 and numerical-simulation-result data Ds (simulation-result graphic data Dg2) on the section shown in FIG. 7 are displayed in a superimposed manner.

More specifically, in the display example shown in FIG. 8, three-dimensional CAD model data Dc, and numerical-simulation-result data Ds, which two-dimensionally indicates a cross-section shape 42 of the object 40, are displayed in a superimposed manner. That is, the physical quantity of the numerical-simulation-result data of the object 40 is displayed in association with the shape of the cross-section 42 of the object 40.

Also in the case of this display example, by simultaneously viewing three-dimensional CAD model data Dc and numerical-simulation-result data Ds (physical quantity), the operator can visually recognize the shape of the object 40 which is indicated by three-dimensional CAD model data Dc, and numerical-simulation-result data Ds (physical quantity) on the section in a form in which both are associated with each other. This is an advantage in reducing a time necessary for analyzing and studying an analysis result.

In other words, in the embodiment, numerical-simulation-result data Ds is displayed such that physical quantity on an arbitrarily designated section is indicated by a distribution based on a tone difference or gradation difference. Thus, the operator can easily grasp the distribution of the physical quantity in the object 40 (the three-dimensional CAD model), so that a detailed study is possible.

In addition, in this case, a section-shape-location setting step of determining the location of the section of the object 40 in accordance with an operation by the operator may be added.

Specifically, in the section-shape-location setting step, after the initial screen is displayed in step S14, a setting screen for designating the location of the section shape of the object 40 is displayed, and the operator operates the mouse 18 or the keyboard 20 with the setting screen, whereby the CPU 12 receives the input operation and determines the location of the section shape of the object 40.

In addition, on a screen of the display apparatus 22, a first representation in which three-dimensional CAD model data Dc, and numerical-simulation-result data Ds based on a first analysis technique are superimposed on each other, and a second representation in which three-dimensional CAD model data Dc, and numerical-simulation-result data Ds based on a second analysis technique are superimposed on each other may be displayed at the same time (in an arranged manner).

In this case, numerical-simulation-result data Ds based on different analysis techniques can be visually recognized at the same time. Thus, this is an advantage in reducing a time necessary to simultaneously analyzing and studying analysis results based on different analysis techniques.

In other words, by simultaneously displaying numerical simulation results based on different analysis results on the same screen in a form superimposed on a three-dimensional CAD model, a study is possible without awareness of a difference in model shape between different analysis techniques.

The types of different analysis techniques by which analysis results are simultaneously displayed are not limited to the above two types. Obviously, analysis results based on three or more types of different analysis techniques may be simultaneously arranged and displayed.

In addition, in step S30, on a screen of the display apparatus 22, a first display state in which three-dimensional CAD model data Dc, and numerical-simulation-result data Ds based on a first analysis technique are superimposed on each other, and a second display state in which three-dimensional CAD model data Dc, and numerical-simulation-result data Ds based on a second analysis technique are superimposed on each other may be displayed in a switching manner by the CPU 12 on the basis of an operation (operation of the mouse 18 or the keyboard 20) input by the operator.

In this case, numerical-simulation-result data Ds (physical quantity) based on different analysis techniques can be visually recognized in a switching manner. Thus, this is an advantage in reducing a time necessary for analyzing and studying analysis results based on different analysis techniques while comparing the analysis results.

In other words, by instantaneously switching numerical-simulation-result representations, the results can be studied on the basis of various physical phenomena from various perspectives.

The types of different analysis techniques by which analysis results are displayed in a switching manner are not limited to the above two types. Obviously, analysis results based on three or more types of different analysis techniques may be displayed in a switching manner.

In the embodiment, a case in which physical quantity of numerical-simulation-result data Ds is displayed by a color tone difference or gradation difference has been described. However, a display form of the physical quantity of numerical-simulation-result data Ds is not limited to the tone difference or gradation difference. The following display forms are possible.

The physical quantity of numerical-simulation-result data Ds may be displayed in a form so as to be replaced by at least one of an arrow direction, an arrow length, an arrow width, and an arrow color. This is suitable for displaying physical quantity, such as a principal stress in a structural analysis, including a direction such as a tensile direction and a direction of compression, or physical quantity including a direction, such as a flow velocity of heat in a thermal-liquid analysis.

In addition, the physical quantity of numerical-simulation-result data Ds may be displayed by using a contour line connecting coordinates representing identical values of the physical quantity.

In addition, the physical quantity of numerical-simulation-result data Ds may be displayed by using hatching direction and density, a dot density, a change in pattern, or the like.

In the embodiment, a case in which the analysis technique is each of a structural analysis and a thermal-liquid analysis has been described. However, the analysis technique is not limited thereto. Obviously, various analysis techniques of the related art, such as a heat transfer analysis and an electromagnetic field analysis, can be used.

In addition, in the embodiment, a case in which the display apparatus 22 is used as an image output apparatus has been described. Obviously, the printer 30 may be used instead of the display apparatus 22.

It should be understood by those skilled in the art that various modifications, combinations, sub-combinations and alterations may occur depending on design requirements and other factors insofar as they are within the scope of the appended claims or the equivalents thereof.

What is claimed is:

1. A computer programmed with a numerical-simulation-result display program causing the computer to execute the steps of:

reading three-dimensional-computer-aided-design-model data of an object to be analyzed;

converting the read three-dimensional-computer-aided-design-model data into computer-aided-design graphic data capable of being displayed on an image output apparatus, the displayed computer-aided-design graphic data establishing a first image of the object on the image output apparatus;

reading numerical-simulation-result data of the object, the numerical-simulation-result data including data establishing at least an outline of the object, the numerical-simulation-result data including data establishing a physical quantity of the object;

converting the read numerical-simulation-result data into simulation-result graphic data capable of being displayed on the image output apparatus, the simulation-result graphic data establishing a second image of the object with a visual effect representing the physical characteristic established by the numerical-simulation-result data; and displaying the computer-aided-design graphic data and the simulation-result graphic data on the image output apparatus in a superimposed manner so that the first and second images of the same object are coincident, wherein, in the step of displaying the computer-aided-design graphic data and the simulation-result graphic data, the physical quantity is displayed in association with the shape of a cross-section of the object, in the step of reading the numerical-simulation-result data, first numerical-simulation-result data and second numerical-simulation-result data respectively corresponding to first and second analysis techniques are read, in the step of converting the read numerical-simulation-result data, the first numerical-simulation-result data and second numerical-simulation-result data read in the step of reading the numerical-simulation-result data are respectively converted into first simulation-result graphic data and second simulation-result graphic data that can be displayed on the image output apparatus, and in the step of displaying the computer-aided-design graphic data and the simulation-result graphic data, the computer-aided-design graphic data and the first simulation-result graphic data are displayed on the image output apparatus in a superimposed manner, and, at the same time, the computer-aided-design graphic data and the second simulation-result graphic data are displayed on the image output apparatus in a superimposed manner.

2. The computer programmed with a numerical-simulation-result display program according to claim 1, wherein, in the step of displaying the computer-aided-design graphic data and the simulation-result graphic data, the physical quantity is displayed in a form so as to be replaced by one of a color tone difference and a gradation difference.

3. The computer programmed with a numerical-simulation-result display program according to claim 1, wherein, in the step of displaying the computer-aided-design graphic data and the simulation-result graphic data, the physical quantity is displayed in a form so as to be replaced by at least one of an arrow direction, an arrow length, an arrow width, and an arrow color.

4. The computer programmed with a numerical-simulation-result display program according to claim 1, wherein, in the step of displaying the computer-aided-design graphic data and the simulation-result graphic data, the physical quantity is displayed by using a contour line connecting coordinates representing identical values of the physical quantity.

5. The computer programmed with a numerical-simulation-result display program according to claim 1, wherein, in the step of displaying the computer-aided-design graphic data and the simulation-result graphic data, the physical quantity is displayed in association with a three-dimensional shape of the object.

6. The computer programmed with a numerical-simulation-result display program according to claim 1, wherein:

in the step of displaying the computer-aided-design graphic data and the simulation-result graphic data, the physical quantity is displayed in association with the shape of a section of the object; and the step of displaying the computer-aided-design graphic data and the simulation-result graphic data includes determining the location of the shape of the section of the object on the basis of an operation performed by an operator.

7. The computer programmed with a numerical-simulation-result display program according to claim 1, wherein, in the step of reading the numerical-simulation-result data, the read numerical-simulation-result data corresponds to one type of analysis technique.

8. The computer programmed with a numerical-simulation-result display program according to claim 1, wherein:

in the step of displaying the computer-aided-design graphic data and the simulation-result graphic data, a first image state in which the computer-aided-design graphic data and the first simulation-result graphic data are displayed on the image output apparatus in a superimposed manner, and a second image state in which the computer-aided-design graphic data and the second simulation-result graphic data are displayed on the image output apparatus in a superimposed manner are switched between on the basis of an operation input by an operator.

9. The computer programmed with a numerical-simulation-result display program according to claim 1, wherein the image output apparatus is one of a display apparatus and a printing apparatus.

10. A numerical-simulation-result display method comprising the steps of:

reading three-dimensional-computer-aided-design-model data of an object to be analyzed;

converting the read three-dimensional-computer-aided-design-model data into computer-aided-design graphic data capable of being displayed on an image output apparatus, the displayed computer aided design graphic data establishing a first image of the object on the image output apparatus;

reading numerical-simulation-result data of the object, the numerical simulation result data including data establishing a an outline of the object, the numerical simulation result data including data establishing a physical quantity of the object;

converting the read numerical-simulation-result data into simulation-result graphic data capable of being displayed on the image output apparatus, the simulation result graphic data establishing a second image of the object with a visual effect representing the physical characteristic established by the numerical simulation result data; and displaying the computer-aided-design graphic data and the simulation-result graphic data on the image output apparatus in a superimposed manner so that the first and second images of the same object are coincident, wherein, in the step of displaying the computer-aided-design graphic data and the simulation-result graphic data, the physical quantity is displayed in association with the shape of a cross-section of the object, in the step of reading the numerical-simulation-result data, first numerical-simulation-result data and second numerical-simulation-result data respectively corresponding to first and second analysis techniques are read, in the step of converting the read numerical-simulation-result data, the first numerical-simulation-result data and second numerical-simulation-result data read in the step of reading the numerical-simulation-result data are respectively converted into first simulation-result graphic data and second simulation-result graphic data that can be displayed on the image output apparatus, and in the step of displaying the computer-aided-design graphic data and the simulation-result graphic data, the computer-aided-design graphic data and the first simulation-result graphic data are displayed on the image output apparatus in a superimposed manner, and, at the same time, the computer-aided-design graphic data and the second simulation-result graphic data are displayed on the image output apparatus in a superimposed manner.

11. A numerical-simulation-result display system comprising:

an image output apparatus;

three-dimensional-computer-aided-design-model-data input means for reading three-dimensional-computer-aided-design-model data of an object to be analyzed;

computer-aided-design-model-data converting means for converting the three-dimensional-computer-aided-design-model data read by the three-dimensional-computer-aided-design-model-data input means into computer-aided-design graphic data capable of being displayed on the image output apparatus, the displayed computer aided design graphic data establishing a first image of the object on the image output apparatus;

numerical-simulation-result-data input means for reading numerical-simulation-result data of the object, the numerical simulation result data including data establishing at least on outline of the object, the numerical simulation result data including data establishing a physical quantity of the object;

simulation-result converting means for converting the numerical-simulation-result data read by the numerical-simulation-result-data input means into simulation-result graphic data capable of being displayed on the image output apparatus, the simulation result graphic data establishing a second image of the object with a visual effect representing the physical characteristic established by the numerical simulation result data; and display means for displaying the computer-aided-design graphic data and the simulation-result graphic data on the image output apparatus in a superimposed manner so that the first and second images of the same object are coincident, wherein, the display means displays the physical quantity in association with the shape of a cross-section of the object, the numerical-simulation-result-data input means reads first numerical-simulation-result data and second numerical-simulation-result data respectively corresponding to first and second analysis techniques, the simulation-result converting means respectively converts the first numerical-simulation-result data and second numerical-simulation-result data into first simulation-result graphic data and second simulation-result graphic data that can be displayed on the image output apparatus, and the display means displays the computer-aided-design graphic data and the first simulation-result graphic data on the image output apparatus in a superimposed manner, and, at the same time, displays the computer-aided-design graphic data and the second simulation-result graphic data on the image output apparatus in a superimposed manner.

12. A numerical-simulation-result display system comprising:

an image output apparatus;

a three-dimensional-computer-aided-design-model-data input unit configured to read three-dimensional-computer-aided-design-model data of an object to be analyzed;

a computer-aided-design-model-data converting unit configured to convert the three-dimensional-computer-aided-design-model data read by the three-dimensional-computer-aided-design-model-data input unit into computer-aided-design graphic data capable of being displayed on the image output apparatus, the displayed computer aided design graphic data establishing a first image of the object on the image output apparatus;

a numerical-simulation-result-data input unit configured to read numerical-simulation-result data of the object, the numerical simulation result data including data establishing at least an outline of the object, the numerical simulation result data including data establishing a physical quantity of the object;

a simulation-result converting unit configured to convert the numerical-simulation-result data read by the numerical-simulation-result-data input unit into simulation-result graphic data capable of being displayed on the image output apparatus, the simulation result graphic data establishing a second image of the object with a visual effect representing the physical characteristic established by the numerical simulation result data; and a display unit configured to display the computer-aided-design graphic data and the simulation-result graphic data on the image output apparatus in a superimposed manner so that the first and second images of the same object are coincident, wherein, the display unit displays the physical quantity in association with the shape of a cross-section of the object, the numerical-simulation-result-data input unit reads first numerical-simulation-result data and second numerical-simulation-result data respectively corresponding to first and second analysis techniques, the simulation-result converting unit respectively converts the first numerical-simulation-result data and second numerical-simulation-result data into first simulation-result graphic data and second simulation-result graphic data that can be displayed on the image output apparatus, and the display unit displays the computer-aided-design graphic data and the first simulation-result graphic data on the image output apparatus in a superimposed manner, and, at the same time, displays the computer-aided-design graphic data and the second simulation-result graphic data on the image output apparatus in a superimposed manner.

* * * * *